Feb. 25, 1958     E. L. RUTH ET AL     2,824,745
MAGNETIC CHUCK
Filed Aug. 7, 1953     2 Sheets-Sheet 1
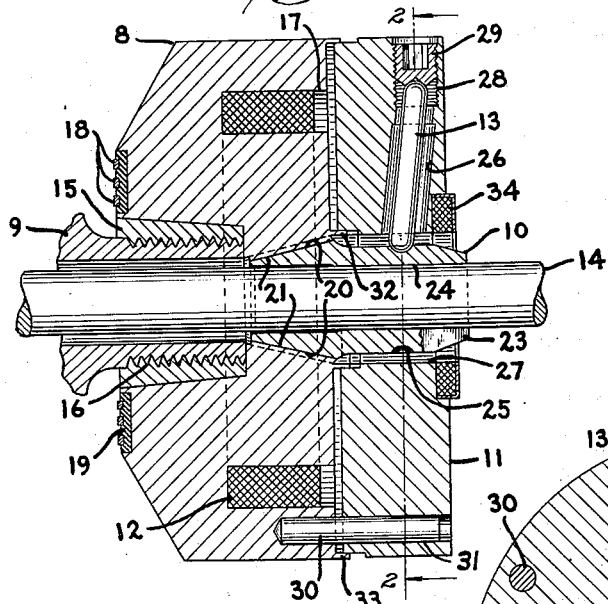
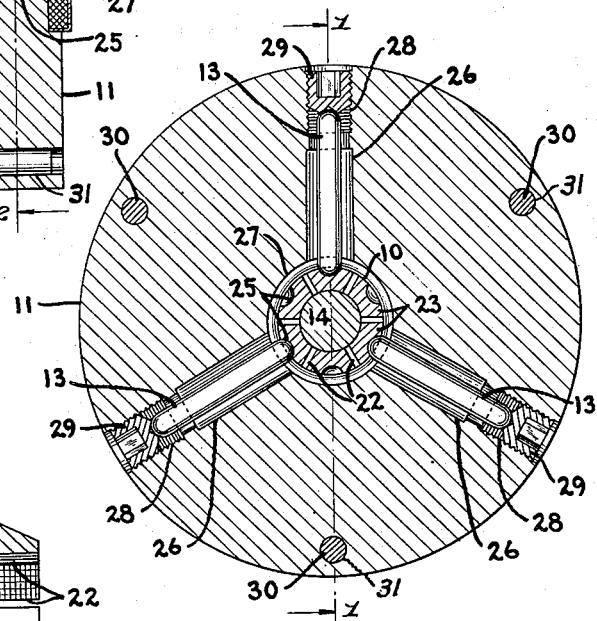
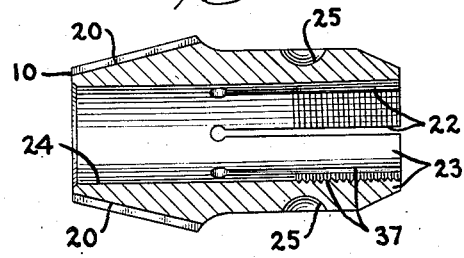
INVENTORS
E. L. Ruth
BY S. A. Reitzner
Lieber & Lieber
ATTORNEYS.

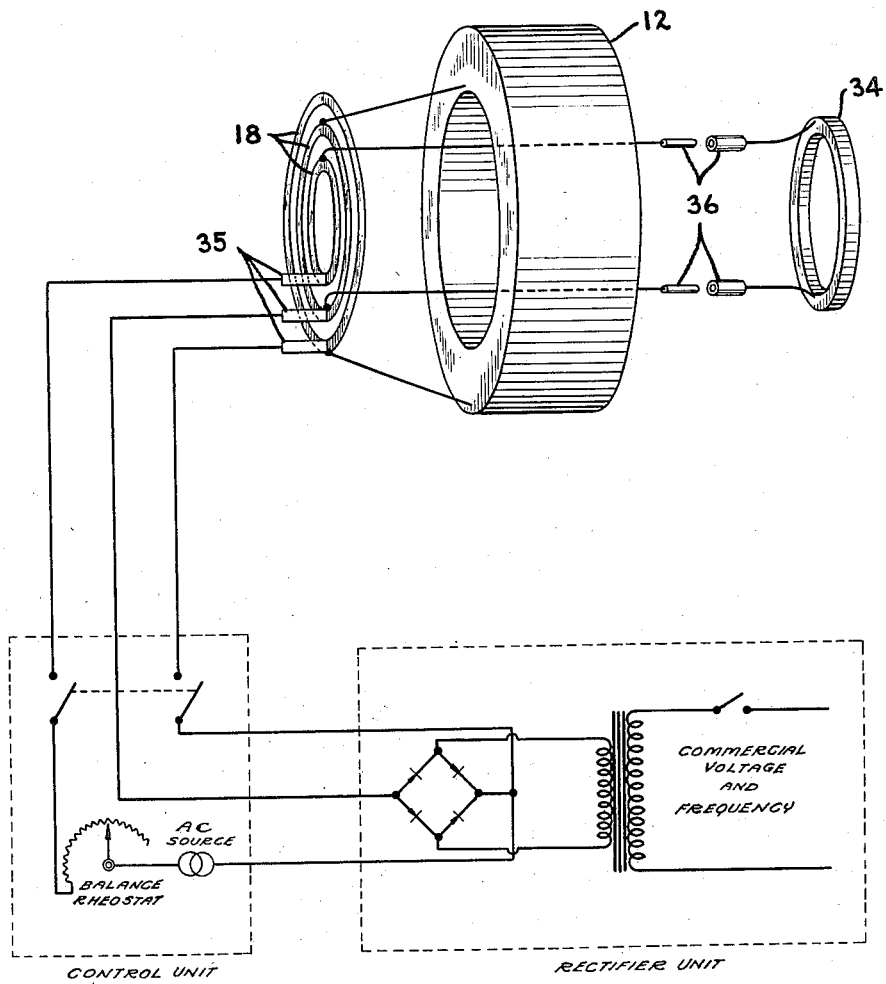

United States Patent Office 2,824,745
Patented Feb. 25, 1958

2,824,745

MAGNETIC CHUCK

Elmer L. Ruth and Stanley A. Reitzner, Appleton, Wis., assignors to Tom L. Cahoe, Appleton, Wis.

Application August 7, 1953, Serial No. 372,868

7 Claims. (Cl. 279—118)

The present invention relates generally to improvements in chucks for metal working or other machines, and relates more particularly to improvements in the construction and operation of magnetically actuated clamping means cooperable with a work engaging collet for firmly gripping the stock or work.

A primary object of the invention is to provide an improved magnetic chuck for lathes or other metal working machines which is extremely simple and compact in construction and which is moreover highly efficient and practical in operation.

While the present applicants are well aware of the fact that numerous types of magnetic chucks have heretofore been proposed for clamping the work in position on diverse types of machine tools, it is a matter of common knowledge in the industry that the majority of such prior magnetically actuated chucks have proven objectionable for various reasons. In some cases, these prior devices have proven undesirably complicated, bulky and difficult to handle. In other cases, the chucks are not universally applicable to existent machine tools since the use thereof is usually confined to only one or two types of metal working machines. Still another common objection is that the clamping or gripping action of most of these chucks is not effected automatically upon insertion of the work within the collet and subsequent energization of the magnet. And finally, the clamping or gripping action effected by the device is often undesirably insecure and such devices are therefore not practical in all instances.

It is, therefore, a more specific object of this invention to provide an improved magnetic chuck which obviates all of these and other disadvantages attendant prior devices.

Another specific object of our invention is to provide an improved magnetic chuck adapted for use with diverse types of machines for effectively clamping the work in position automatically upon insertion thereof within the collet and energization of the magnet.

Another specific object of the invention is to provide an improved magnetic chuck of simple construction which may be readily operated by a novice and which comprises relatively few parts, all of which are easily accessible for inspection, replacement and/or repair.

Another specific object of our present invention is to provide an improved magnetic chuck wherein the work or tool gripping collet is caused to safely and securely drivingly engage the work by toggle means effective upon energization of the magnet for applying radial pressure to the collet.

An additional specific object of the present invention is to provide an improved simple, efficient, safely operable and widely applicable chuck for machine tools which may be readily manufactured, sold and used at relatively low cost, and which embodies an annular series of independently adjustable toggles for radially forcing the collet to drivingly engage the work.

Still another important specific object of the present invention is to provide a new and improved magnetic chuck which is exceedingly durable in construction and highly efficient in operation, and wherein means are provided for effectively minimizing the accumulation of chips or the like on the work when such work is susceptible to magnetization.

A further specific object of the present invention is to provide an improved magnetic chuck comprising a chuck body adapted to be magnetized to axially move a chuck plate toward the body to cause means associated with the plate to effectively force the collet into driving engagement with the work, improved means being provided for guiding the plate in its movement and for preventing relative rotation of the plate and the body.

These and other specific objects and advantages of the improvement will be apparent from the following detailed description.

A clear conception of the several features constituting our present invention, and of the mode of constructing and of utilizing magnetic chucks embodying the improvements, may be had by referring to the drawing accompanying and forming a part of this specification, wherein like reference characters designate the same or similar parts in the various views.

Fig. 1 is a longitudinal vertical section through one of the improved chucks applied to a fragment of a typical lathe spindle, the section being taken along the line 1—1 of Fig. 2;

Fig. 2 is a transverse vertical section through the chuck taken along the line 2—2 of Fig. 1;

Fig. 3 is a somewhat enlarged longitudinal vertical section through a typical split collet adapted for use with the chuck, the section being taken along the line 3—3 of Fig. 4;

Fig. 4 is a similarly enlarged end view of the collet; and

Fig. 5 is a schematic diagram of the electrical system for energizing the main and auxiliary magnets of the improved chuck.

While the invention has been shown and described herein as being applied in a specific manner to the spindle of a metal working lathe and as embodying a particular type of split collet, it is not desired or intended to thereby unnecessarily restrict or limit the scope or utility of the improved features since the chuck may obviously be utilized with diverse types of machines for work on various materials, with the chuck body being attachable in any suitable manner and with other types of collets being readily adaptable; and it is also contemplated that specific descriptive terms employed herein shall be given the broadest possible interpretation consistent with the disclosure.

Referring to the drawings, the improved chuck comprises, in general, a main chuck body or block 8 of magnetic material adapted for attachment to a conventional lathe spindle 9 or the like for rotation therewith; a work engaging collet 10 carried by the chuck body 8; a chuck plate 11 also of magnetic material axially movable relative to the body 8; means such as an electromagnetic winding 12 for magnetizing the chuck body 8 to attract and move the plate 11 toward the body 8; and other means such as a plurality of toggles 13 or like members cooperable with the plate 11 and with the collet 10 for causing the collet to drivingly engage the work 14 upon movement of the plate 11.

The chuck body or block 8 may be provided with a suitable attachment core 15 having screw threads 16 or other means for conveniently securing the same to the spindle 9; and one side of the body 8 may be formed with an annular recess or groove 17 therein for receiving the winding 12, the opposite side of the body 8 being provided with slip rings 18 insulated therefrom in a suitable manner as indicated at 19 and connected with the winding or coil 12 as will hereinafter be more fully described. The collet 10 is preferably provided with an annular tapered surface at one end thereof receivable in a correspondingly tapered bore of the body 8, the tapered end of the collet 10 being formed with one or more longitudinal grooves 20 cooperable with corresponding ribs or tongues 21 within the tapered bore of the body 8 to key the collet to the body; and the other end of the collet 10 is split longitudinally in a number of places, as indicated at 22, to provide an annular series of elongated resilient work gripping fingers 23, the collet being provided with a work receiving bore 24 therethrough of somewhat larger diameter than the work 14. The work gripping fingers 23 of the collet are preferably each formed with an outer socket 25, each symmetrical set of three of which is interchangeably cooperable with the inner ends of the three symmetrically disposed toggles 13; and these toggles may be conveniently housed within an annular series of radial passages 26 in the plate 11 which has a central bore 27 to permit axial movement thereof over the collet. One set of the fingers 23 is preferably roughened while the other is smooth, and the passages 26 are of considerably greater diameter than the toggles to permit toggle action upon movement of the plate 11 while the outer ends of the passages 26 are threaded as at 28 for the reception of closure and adjustment screws 29 adapted to seal the respective passages and to coact with the outer ends of the respective toggles 13 thereby permitting independent adjustment of the effective work engaging action of each toggle. To guide the plate 11 in its axial movement and to effectively prevent relative rotation of the plate 11 and body 8, the plate is provided with an annular series of axially directed bores 31 which are slidably cooperable with guide pins 30 projecting from and secured to the body 8; and the space between the body 8 and the plate 11 may be sealed to minimize the possibility of chip gathering therein, by forming annular inner and outer flanges 32, 33 respectively on the body 8 adapted to overlap the adjacent edges of the plate 11 as shown.

Due to a certain amount of stray flux leakage ordinarily found to flow through the work or stock 14 when such work is iron or steel, we have found it desirable to also provide an auxiliary coil or electro-magnetic winding 34 which may be conveniently embedded in the plate 11 adjacent the axial bore 27 thereof, and which is wound in a direction opposite to that of the main coil 12 to thereby effectively neutralize or buck out the leakage flux flowing through the work 14 upon energization of the coils; and this auxiliary or neutralizing coil 34 may likewise be connected with certain of the slip rings 18 as hereinafter more fully described.

The electric circuit for energizing the windings 12 and 34 is shown diagrammatically in Fig. 5 of the drawing and may be briefly described as follows: Current is derived from the available commercial source and is transmitted through three lead lines to the three slip rings 18 past an intervening control unit wherein the current fed to the inner slip ring is adjusted by a rheostat with a small alternating current being superimposed upon the direct current voltage applied to the inner ring to make the adjustment less critical. The control unit also provides means for opening and closing the circuit, such means being illustrated as consisting of a switch for the lines leading to the inner and outer slip rings; and contacts may be effected with the rings 18 in the customary manner by means of brushes 35. As also shown in Fig. 5, the main coil 12 is connected to the outer slip ring and to the intermediate ring with the auxiliary coil 34 being connected to the inner ring and to the intermediate ring; and to compensate for axial movement of the ring 11 carrying the coil 34, a pair of sliding contacts 36 of known construction may be employed in the lines from the slip rings to the coil 34.

In operation, the chuck body 8 is first secured to the lathe spindle 9 in an obvious manner, the brushes 35 are properly positioned against the respective slip rings 18, the collet 10 is slid into position within the tapered bore of the body 8 with the key 21 within the groove 20, the plate 11 is slid over the collet fingers 23 with the inner ends of the toggles 13 seated within the recesses 25 of certain of the fingers 23, and the work is properly positioned within the axial bore 24 of the collet 10. If necessary, the toggles 13 may be properly adjusted by means of the screws 29 to produce the desired toggle work clamping action; and the switches in the control unit may then be actuated to close the circuit, thereby energizing the windings 12 and 34 through their connections with the slip rings 18 as hereinabove set forth. To eliminate flux leakage through the work 14 and thereby prevent iron or steel chips from clinging thereto, the current fed to the coil 34 is adjusted by the rheostat to the correct value to exactly balance out the leakage flux of the main coil 12 so that a net result of zero flux is obtained in the stock or work piece 14; and the alternating current voltage superimposed upon the direct current voltage applied to the auxiliary coil 34 aids in making this adjustment less critical. Immediately upon energization of the coils, the plate 11 is magnetically attracted to the adjacent face of the block 8 causing it to move axially toward the body or block with the pins 30 guiding the plate in such axial movement. As the plate 11 thus moves toward the body 8, the toggles 13 carried by the plate cooperate with the resilient collet fingers 23 and apply radial pressure thereto to cause the fingers to drivingly engage the work 14; and to increase the effective grip or holding action of the work engaging collet fingers, the internal surfaces thereof may be knurled or roughened as at 37. The work 14 is thus firmly gripped or clamped by the chuck, and the lathe or like machine may then be operated in the usual manner.

From the foregoing detailed description, it is apparent that our present invention provides an improved magnetic chuck for diverse types of machines which is simple, compact and durable in construction and which is highly efficient in operation. The improved device comprises relatively few simple parts which may be readily manufactured and assembled and all of which are readily accessible for inspection, replacement and/or repair. By reason of the simplicity of the construction of the improved devices, they are readily applicable to various types of machines for working on all types of materials and they may be easily operated by relatively inexperienced personnel; and the gripping action transmitted radially by the toggles 13 to the fingers 23 of the collet is effected automatically upon energization of the magnet to firmly clamp and hold the work 14. The improved chucks may be produced and sold in large quantities at relatively low cost and although the device has been shown in the present instance as especially applicable to metal working lathes wherein bar stock 14 is gripped by the collet, the devices may obviously be used in machines wherein the collet is adapted to drivingly engage the tool for performing the work on a stationary piece. The improved magnetic chuck has in fact proven highly satisfactory in actual operation and entirely practical in numerous phases of actual use with diverse machines; and the toggles may obviously be adjusted independently by means of the screws 29 with the aid of a socket wrench or the like with the guide pins 30 adapted for attachment either to the plate 11 as described or to the body 8. By forming one set of the three collet fingers 23 with roughened gripping surfaces or teeth and the other set with smooth gripping surfaces, the collet 10 may be caused to cooperate with various kinds of work; and when the toggles 13 coact with the set of fingers 23 having smooth gripping surfaces as in Figs. 1 and 2, the collet may be used to grip smooth and highly finished stock 14 without marring the surface thereof. When the toggles 13 coact with the other set of fingers 23 having roughened gripping surfaces, the collet may be utilized to effectively grip rougher and relatively unfinished work surfaces. Thus, one collet 13 having smooth and roughened jaws interchangeably cooperable with different types of work is provided.

It should be understood that it is not desired or intended to limit this invention to the exact details of construction or to the precise mode of operation herein shown and described for various modifications within the scope of the appended claims may occur to persons skilled in the art to which this invention pertains.

We claim:

1. A magnetic work driving chuck comprising, a chuck body, a work engaging collet carried by said body, a chuck plate movable relative to said body, means for magnetizing said body to move said plate, means operable by movement of said plate for applying radial work gripping pressure to said collet, and an auxiliary magnet carried by said plate for neutralizing the effect of said body magnetizing means on said work.

2. A work driving chuck comprising, a chuck body, a collet carried by said body and having several independent sets of work clamping fingers, a chuck plate movable relative to said body along said fingers, and an annular series of radially extending toggles housed within said plate and interchangeably cooperable with different sets of said fingers to clamp various types of work.

3. A work driving chuck comprising, a chuck body, a collet carried by said body and having several independent sets of work clamping fingers, one set of said fingers having smooth work engaging surfaces and another set having roughened corresponding surfaces, a chuck plate movable relative to said body along said fingers, and toggles interchangeably cooperable with different sets of said fingers to clamp various types of work.

4. A magnetic work driving chuck comprising, a chuck body, a work engaging collet carried by said body, a chuck plate movable toward and away from said body, means for magnetizing said body to move said plate toward said body, toggle means housed within said plate and operable upon movement of said plate for applying radial work gripping pressure to said collet, and an auxiliary magnet carried by said plate for neutralizing the effect of said body magnetizing means on said work.

5. A magnetic work driving chuck comprising, a chuck body, a work engaging collet carried by said body, means for positively preventing relative rotation between said collet and said body, a chuck plate axially movable toward and away from said body, means for magnetizing said body to move said plate toward said body, means for guiding said plate in its movement and for positively preventing relative rotation of said plate and said body, toggle means housed within said plate and operable upon movement of said plate for applying radial work gripping pressure to said collet, and an auxiliary magnet carried by said plate for neutralizing the effect of said body magnetizing means on said work.

6. A magnetic work driving chuck comprising, a chuck body, a work engaging collet carried by said body and having several independent sets of work clamping fingers, a chuck plate movable toward and away from said body, means for magnetizing said body to move said plate toward said body, an annular series of radially extending toggles housed within said plate and interchangeably cooperable with different sets of said fingers to clamp various types of work, and an auxiliary magnet carried by said plate for neutralizing the effect of said body magnetizing means on said work.

7. A magnetic work driving chuck comprising, a chuck body, a collet carried by said body and having several independent sets of work clamping fingers, a chuck plate movable toward and away from said body, means for magnetizing said body to move said plate toward said body, and an annular series of radially extending toggles housed within said plate and interchangeably cooperable with different selected sets of said fingers, said toggles being operable upon movement of said plate for applying radial work gripping pressure to said selected sets of fingers.

References Cited in the file of this patent

UNITED STATES PATENTS

| Re. 23,419 | Stace | Oct. 16, 1951 |
| 512,283 | Elliott | Jan. 9, 1894 |
| 725,346 | Krug | Apr. 14, 1903 |

FOREIGN PATENTS

| 68,746 | Denmark | Feb. 28, 1949 |